Inventor
George F. Schnyer

Sept. 29, 1925.  G. F. SCHNYER  1,555,163
LOCK NUT MACHINE
Filed Aug. 11, 1924   5 Sheets-Sheet 5

Inventor
George F. Schnyer
By Attorneys
Southgate & Southgate

Patented Sept. 29, 1925.

1,555,163

UNITED STATES PATENT OFFICE.

GEORGE F. SCHNYER, OF WORCESTER, MASSACHUSETTS, ASSIGNOR TO INDUSTRIAL LOCK NUT COMPANY, OF WORCESTER, MASSACHUSETTS, A CORPORATION OF MASSACHUSETTS.

LOCK-NUT MACHINE.

Application filed August 11, 1924. Serial No. 731,258.

*To all whom it may concern:*

Be it known that I, GEORGE F. SCHNYER, a citizen of the United States, residing at Worcester, in the county of Worcester and State of Massachusetts, have invented a new and useful Lock-Nut Machine, of which the following is a specification.

This invention relates to a machine for modifying ordinary nuts so as to fit them for the application of a spring to convert them into lock nuts of the general character set forth in the patent to Napoleon R. Thibert, No. 1,326,992, patented January 6, 1920, and especially for applying the springs.

The principal objects of this invention are to provide for conveying the nuts one by one through a series of mechanisms for chamfering, countersinking a central flat depression in the face of each nut, preferably by two operations, rolling over the edge of said face to form an inwardly extending circumferential flange around it so as to produce a groove which will hold a coiled spring, then cutting a slit through the wall of this groove to provide a place for the entrance of the spring, inserting the spring in this groove, gripping its end, turning a mandrel to coil the spring into the proper shape in place within said groove, cutting off its projecting end so as to leave the advance end of the wire sharp to form a spring pawl, and then grinding off the projecting edge of the wire coiled in the nut. The invention also involves improvements in the various instrumentalities for performing the several operations and in their combination with each other.

Further objects and advantages of the invention will appear hereinafter.

Reference is to be had to the accompanying drawings, in which.

I have shown the invention as applied to a chain conveyor type of machine, which is not essential to the invention as it can be used with a machine of the rotary table type or other construction in which means is provided for moving the nuts to be operated upon through a path, and stopping them intermittently to permit the various operations to be performed upon them.

By reference to the above mentioned patent, it will be seen that an ordinary standard nut can be modified so as to permit of the locking feature to be added thereto and this invention is for the purpose of accomplishing that alteration. The nut as it comes from the nut machine, is placed in this machine, chamfered off, countersunk at the end to form a depression concentric with the threaded hole and not extending as far as the chamfered edges. This is then deepened preferably and enlarged and then its outer edge is rolled over to form a circumferential inward wall, thus converting the countersunk depression into a circular groove for the reception of the spring later. Now the wall is sawed through and then the wire is fed through the slit thus produced and turned in the recess in the nut to form it into the desired shape to produce the integral spring pawl on the end for engaging the threads of the bolt and leave the other end projecting out through the slit, thus holding the spring firmly and accurately in the desired position. All that has to be done after that is to grind off the projecting end of the wire where it sticks out through the slit and the lock nut is completed, ready to be discharged from the machine and put on the market.

The machine is provided with a frame 10 on which all the parts are supported. The power is received through a pulley 11 on a driving shaft 12 and transmitted by gears 13 to the back shaft 14 which drives the cross shaft 15 at the opposite end of the machine and a front shaft 16 for a purpose to be described. The shaft 15 is connected by suitable reducing gearing and Geneva motion 17 with another cross shaft 18 to drive it slowly and intermittently. The cross shaft is provided with a sprocket wheel 19 for carrying the conveyor chain 20. This is supported by a similar sprocket wheel and shaft at the other end of the machine mounted to run idly. This sprocket chain need not be described in detail but it is made up of links pivoted to each other, each provided with a screw-threaded stud 21 at the center thereof projecting outwardly. These studs are intended to receive the standard nuts $n$.

It may be stated at this point that for the puprpose of placing the nuts $n$ in the machine in the proper way to be operated on by the various operating elements, an operator has to start them on to the studs 21 slightly as they are passing over the loose sprocket wheel. Immediately after that they come into contact with a screwing on device consisting of a number of spring pressed plungers 22 mounted on a frame 23 and each one engaging the nut as the nut goes by to turn it slightly so that by the time it has reached the end of this screwing on the device the nut will be fully turned up on the threaded stud. As these plungers are spring pressed no harm will be done if it is screwed up at that point before it reaches the end of this part of the journey. At the time when the nut in its travel passes beyond the screwing up device it engages an angular flat surface 24 which, if it is not in the right position, will turn it back thereto as it passes along so that all the nuts after they pass this surface 24 will be positioned exactly alike on the studs. This surface of course turns the nut backwardly or unscrews it slightly to bring it to the right position. If it turns it too far, the nut will be restored to its straight position by afterwards engaging a flat surface 25 on the opposite side.

It may be remarked here, although the matter relates to the delivery of the product, that there is an unscrewing device 26 at the other end of the machine which works in the same way but is longer than the screwing up device 23 and entirely unscrews the nuts from the studs, being located on the opposite side of the carrier chain. Thus the nuts do not have to be handled by an attendant at that end of the machine but drop on a conveyor or into a receptacle which may be provided. There is an adjustable longitudinal guide $26^a$ which extends nearly the entire length of the machine, between the screwing up and unscrewing device which holds the nut as it is positioned as above stated.

Figure 14:
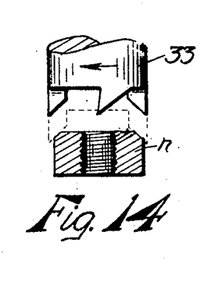
Fig. 14 is a side view of the first operating tool showing the nut in section below and thus illustrating the operation thereon for chamfering the nut.
Figure 15:
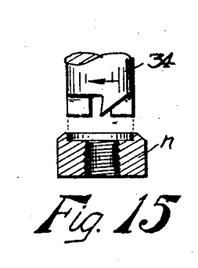
Fig. 15 is a similar view of the second tool showing the nut in the condition in which the operation of that tool is finished.
Figure 16:
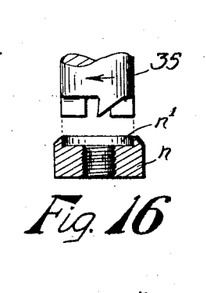
Fig. 16 is a view of the third tool and nut in the same relation.

On an auxiliary frame 27 located over the carrier at the intake end of the machine is located an entirely independent power shaft 28 driven from a separate pulley or motor as may be desired and operating a series of spindles 29, 30, 31 and 32 at different speeds according to the operations to be performed. These four spindles in the present instance are provided with four different tools. The first one is a chamfering tool 33, the operation of which is indicated clearly in Fig. 14. The second one has a counter-boring cutter 34 which cuts a shallow square bottomed recess in the top of the nut, as shown in Fig. 15. This is followed by the third tool 35 which is of a similar character and located on the spindle 31 which cuts the final recess $n'$ deeper and of a little larger diameter than the recess shown in Fig. 15, and has a flat bottom and cylindrical walls. This latter result is shown in Fig. 16. These three rotary cutters 33, 34 and 35 rotate at the speeds for which they are designed and are directly mounted on their several spindles 29, 30 and 31. The next operation is performed by a roller head 36 mounted on a horizontal stud 37 carried by the spindle 32. This spindle rotates on a vertical axis and carries around with it the roller head 36 which has a pair of cylindrical rolling surfaces 38 projecting from it. As these roll around they engage the upper edge of the nut at the periphery of the recess $n'$ and, sufficient pressure being applied, they roll down that edge to form an inturned wall $n^2$. This, it will be seen, converts the flat bottomed cylindrical recess $n'$ into a flat bottomed groove $n^3$ for the reception of the wire spring, as will be described later.

It will be noted that in the above description I have provided for the rotation of the various tools but that they also have to be fed down and up. For this purpose the main shaft 14 is provided with four cams, not all just alike but all acting in a similar way, and so I have designated them by a single number 40. These cams operate bell cranks 41 connected by adjustable links 42 with bell cranks 43 provided with gear segments not shown. These gear segments mesh with racks cut on the backs of vertical slides 44 shown on the frame 27. Each of these slides 44 receive one of the four spindles mentioned and the oscillation of any segment raises and lowers its corresponding slide spindle. The cams are shaped properly to perform the functions indicated above.

Under these spindles the links of the chain 20 are guided and supported on a straight horizontal track 47 that received the thrust. The nuts are clamped in position for these operations by four slides 48 moving forward simultaneously by the action of two cams 49 on the shaft 16. Four nuts are clamped while the four spindles descend. The slides are positively moved back by a cam $49^a$ and similar mechanism while the chain advances one step. This completes the rotary operation on the nut, and it is moved along on the next intermediate motion of the chain into a position under a slitting saw 50. This saw is mounted to be operated by a separated belt 51 or motor as desired and located on a frame 52 movable up and down by a lever 53 and a cam 54 on the shaft 14. The saw simply comes down periodically into the dotted line position in Fig. 18 and cuts a slit in the edge of the wall end 2 clear down into the bottom of the recess or groove $n^3$ therein. This slit is shown as radial although it can go at an angle, (see Fig. 19).

I have also shown on the shaft 28 a pulley driving a belt 56 operating a pump 57 which blows air through pipes 58 and clears away the chips formed by the cutting operations in the recess $n^2$.

Figure 5:
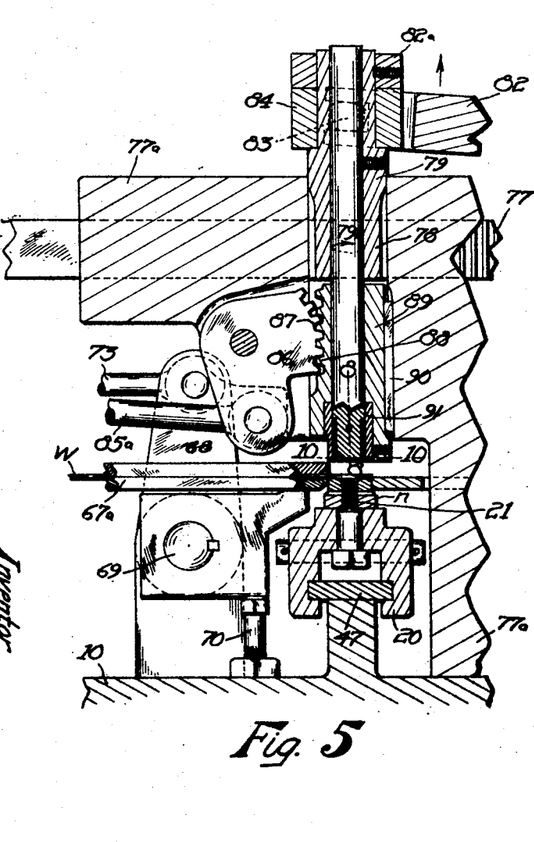
Fig. 5 is a sectional view of the means for coiling and cutting the wire on the line 5—6 of Fig. 3.
Figure 6:
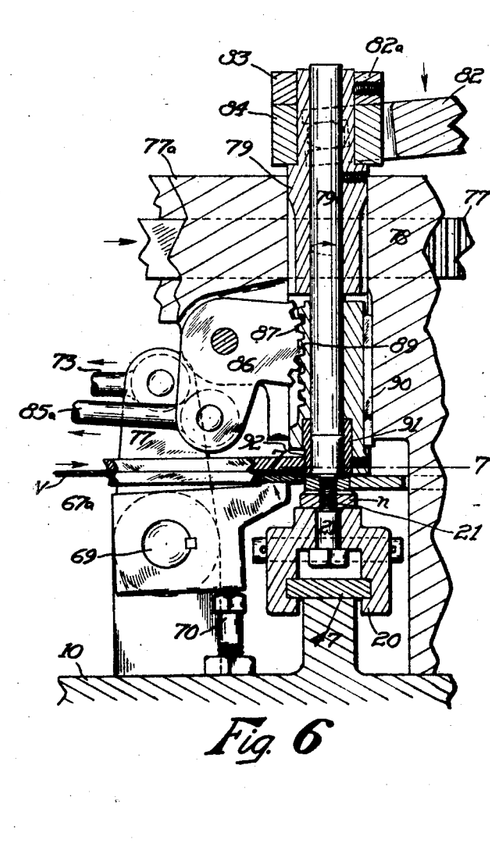
Fig. 6 is a similar sectional view with the parts in their final position and showing the winding spindle in full lines.

The metal working operations are now all performed on the nut itself and the next thing is to feed in the wire W and wind it in position in the nut. The wire is fed between a number of rolls 60 mounted on a feed box 61 on the base 10. These rolls are arranged to contact with each other with a wire engaging feeding groove between them. They are operated intermittently by the oscillation of the shaft on which one of them is located. On the shaft is an arm link 62 operated by an adjustable link 63, the timing of which is controlled by a bell-crank 64 and a cam 65 on the shaft 14. A spring 66 is used to turn the link 62 and keep the roll on the bell-crank 64 in contact with the cam. There is a ratchet device 67 connected with the roll 60 which is positively operated to permit of the oscillation of the arm 62 feeding the wire forward intermittently without feeding it backward. The wire passes from the feed rolls into a long guide $67^a$ which is mounted on a rocking lever 68 and keyed to a shaft 69 supported conveniently on the base 10. This rocking lever is capable of moving slightly up and down from the position shown in Fig. 5 to that shown in Fig. 6 for the purpose of feeding the wire into position, and then cutting it off as will appear. An adjustable stop 70 limits the downward motion of this frame. An arm 71 projecting up from the shaft 69 is oscillated by a cam 72 on the shaft 14 through a bell-crank and link 73.

On the shaft 14 is another cam 75 which by a similar mechanism operates an adjustable link 76 connected with a horizontal rack 77 in housing $77^a$. This rack meshes with a pinion 78 which is cut on a vertical spindle head 79 carrying the spindle $79^a$ and turns it back and forth. The movement of this rack is sufficient to turn the spindle through about three-quarters of a revolution while the spindle is down and turn it back again after it is raised.

Similarly another cam 80 on the shaft 14 through adjustable link mechanism 81 operates a bell-crank 82 and raises and lowers a pin 83 carried by a collar 84 on the spindle head 79. This collar is mounted so that the spindle can turn independently of it but they move together vertically because the collar is set into a shoulder on the pinion 78 and under a collar $82^a$ fixed to the top of the spindle head 79. Therefore, the operation of this cam 80 will raise and lower the spindle $79^a$.

There is still another cam 85 on the shaft 14 which is connected in the way above described by an adjustable link $85^a$ which operates a bell crank 86 which has cut on its gear teeth 87 meshing with a rack 88 on a sleeve 90. Through this sleeve passes the binding spindle $79^a$ and the sleeve is provided with a key 90 to cause it to move up and down with the gear teeth but to prevent it from turning. This sleeve has in its lower portion an annular anvil 91 made of hardened steel and fixed in it so that it will rise and fall with it but will not turn. It is circular in cross section except that it is slabbed off at 92 to form a flat cutting edge cooperating with the front edge of the wire guide $67^a$.

The wire that has been fed in and coiled in a nut is cut off by the mechanism just described and then the feeding operation is started by the cam 65 and the wire fed through the notch cut in the nut and into a notch 97 in the bottom of the spindle 79. Means is provided so that the end of the wire which projects into the mandrel in a radial or other direction will be wound by the mandrel and at the same time drawn into the nut so as to lie in the groove $n^3$ of the nut and the advance end of it will be located in such position that its sharpened end will be in position to engage the thread of a bolt and lock the nut thereto. It is for this purpose that the radial notch 97 is provided.

Figure 11:
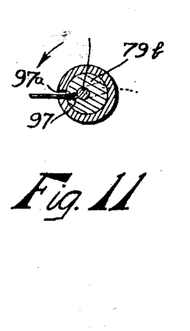
Fig. 11 is a similar view of the mandrel showing the position when the wire has been introduced and clamped or gripped so as to be in readiness to start.

I have also shown means for positively clamping the end of the wire, so that on certain kinds of wire which might not be held merely by the notch itself the device can be made to operate effectively. For this purpose I have shown the end of the spindle $79^a$ as reduced to form a mandrel $79^b$. A hollow sleeve 93 is located on this mandrel and exactly fills the space between it and the annular anvil 91. I have provided a pin 94 diametrically through the mandrel and the sleeve is provided with a slot 95 extending around it only a short distance to allow a little radial play. A spring 96 is coiled around the mandrel and connected positively with the spindle and with the sleeve. The rotation of the spindle $79^a$ brings the sleeve with it but only after a short dwell. The result of this is shown in Fig. 11. When the mandrel first starts to turn it will turn independently of the sleeve and clamp the wire to it against the resistance of the spring 96 and then they will both turn together so that the wire will be forced to be coiled around the mandrel in the groove on the nut. The end of the sleeve is provided with a circular recess 98 for receiving the wire. It will be noticed that the end of the mandrel is slanted off so as to permit of this slight relative motion of the two parts.

Figures 19, 20, 21:
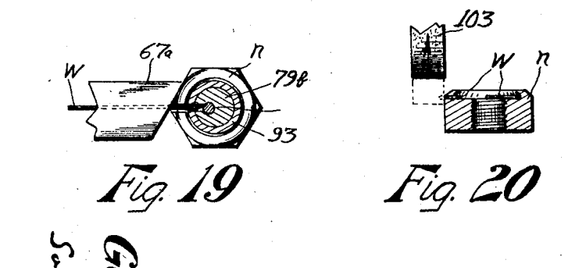
Fig. 19 is a plan of the nut after all these operations have been performed and the wire has been inserted ready to be clamped for the next operation.
Fig. 20 is a sectional view of the completed nut showing the grinding wheel raised from it after it has ground off the projecting end of the wire.
Fig. 21 is a plan of the completed lock nut as prepared by this machine and constructed in accordance with said patent.

The wire, having been coiled around in the manner set forth, is left in the position shown in Fig. 21 when the spindle $79^a$ is lifted by the cam 80. By this action the spring is forced out into the position shown with its sharp end projecting practically radially toward the center, that is, into the screw threads of the bolt on which the nut is to be used. The rest of the wire extends around the nut about three-quarters of the way lying in the groove $n^3$ and expanded into close contact with its wall. The end of the wire sticks out a little beyond the edge of the nut where it is cut off by the next action of the cutter $67^a$. See Fig. 19. Now, a cam 100 on the shaft 14 actuates a lever 101 to bring down the motor 102 carrying an emery wheel 103 located at the proper angle to just trim off the end of the wire projecting from the nut without cutting into the nut in any way. This action is indicated in Fig. 20 and of course occurs at a certain period when the chain is stationary for performing the other operations. This is the last operation performed on the work except the unscrewing of the completed product by the device 26, as previously described.

Figure 1:
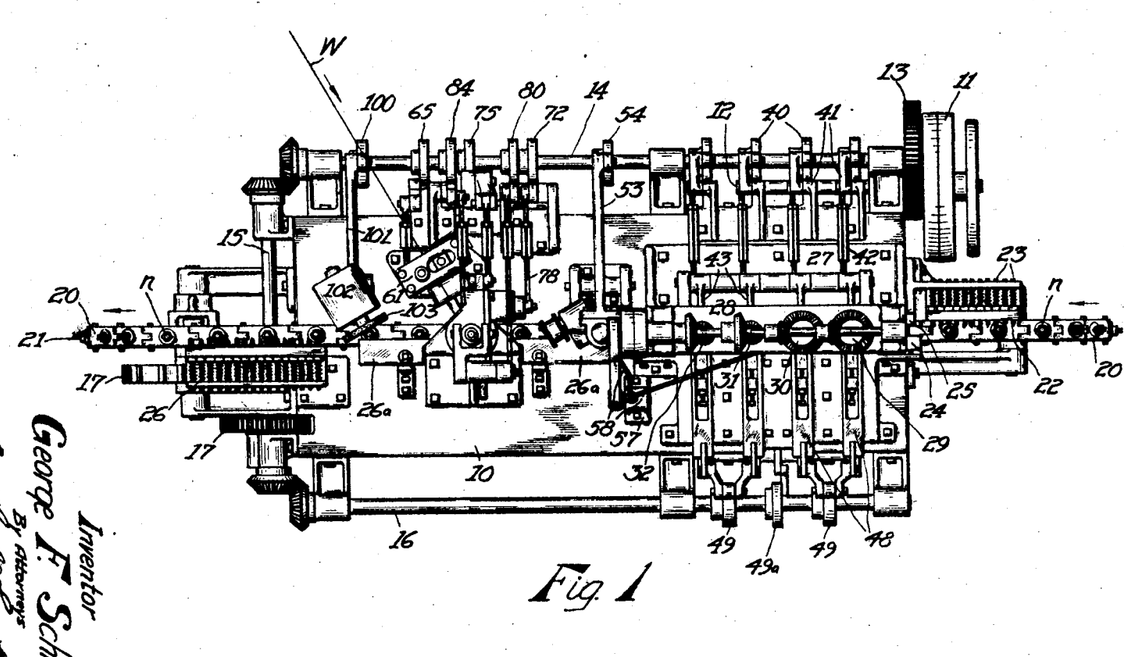
Fig. 1 is a plan of a machine constructed in accordance with this invention.
Figure 2:
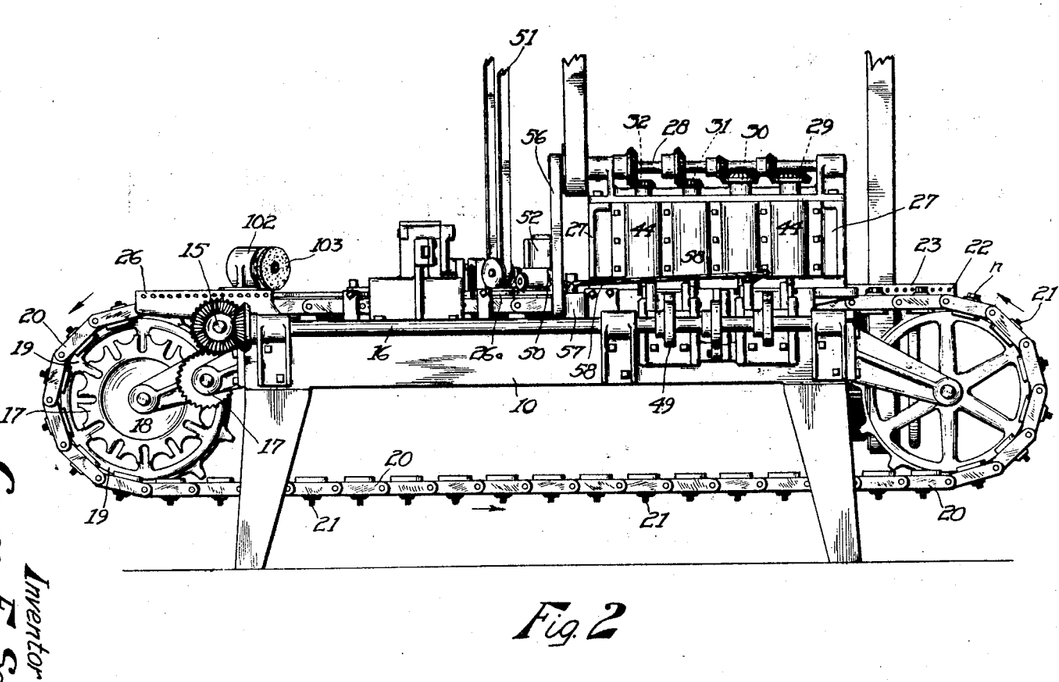
Fig. 2 is a front elevation of the same.
Figure 3:
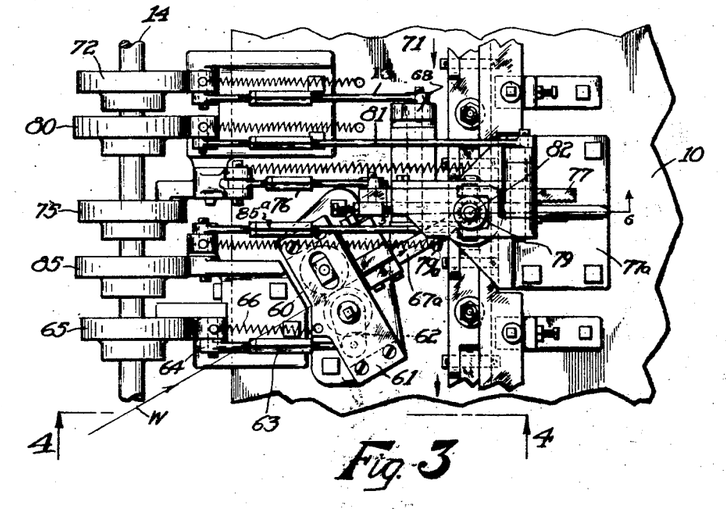
Fig. 3 is a plan on enlarged scale of the spring feeding, coiling, and cutting mechanism.
Figure 4:
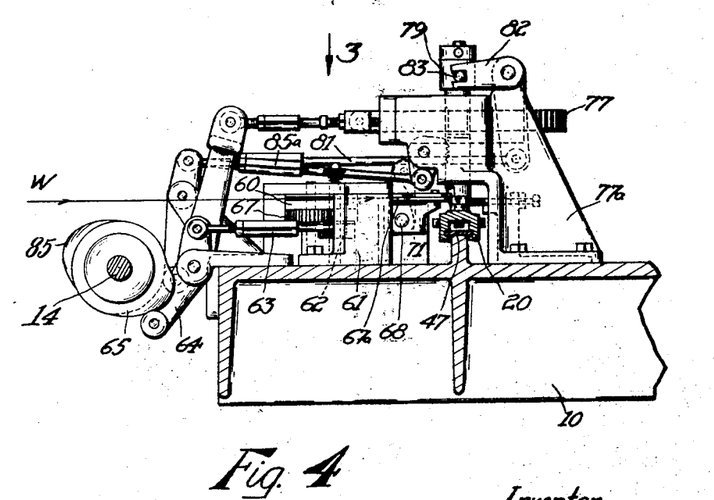
Fig. 4 is a transverse sectional view on the line 4—4 of Fig. 3, showing the same parts in end elevation.
Figures 7, 8, 12, 13:
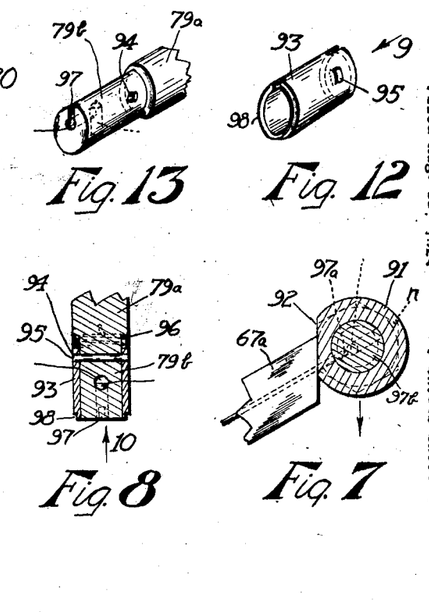
Fig. 7 is a horizontal sectional view of the cutting mechanism on the line 7—7 of Fig. 6.
Fig. 8 is a sectional view of the mandrel on the line 8—8 of Fig. 5.
Fig. 12 is a perspective view of the lower end of this mandrel.
Fig. 13 is a perspective lower end view of the spindle without the external elements.
Figure 9:
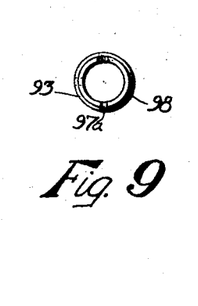
Fig. 9 is a bottom end plan of the mandrel.
Figure 10:
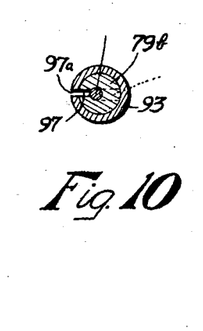
Fig. 10 is a sectional view on the line 10—10 of Fig. 5 showing the parts in the position they occupy before the mandrel is brought down and the end of the wire introduced.
Figure 17:
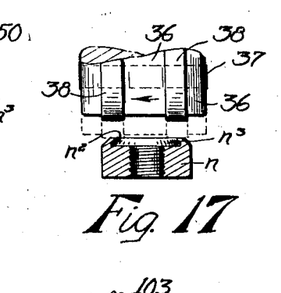
Fig. 17 is a similar view of the rolling mechanism and the nut after the operation has been performed.
Figure 18:
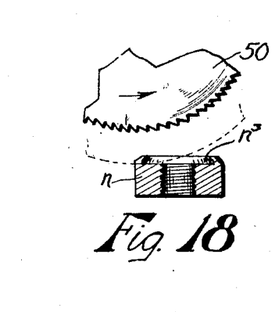
Fig. 18 is a sectional view of the nut showing the slitting saw after it has completed its work and ascended from it.

The operation has been described in full but it can be summarized by stating that the nuts $n$ are just started on the studs 21 by an attendant at the right hand end of the machine, as shown in Figs. 1 and 2. The screwing up device 23 screws them up tight on the studs. Then they are straightened by the two surfaces 24 and 25. These actions are accomplished independent of the particular way in which the chain operates but the operation of the chain is intermittent. The nuts are thus straightened out so that two of the opposite flat sides are parallel with the line of motion of the chain. Now, after that, at the first stop of the chain, the nut is under the tool 33 and is clamped in that position by the first slide 48 which now moves up. The tool 33 which constantly rotates moves down to the dotted line position in Fig. 14 and chamfers the nut. The tool and clamp both move back, the chain moves forward another step, the countersinking tool 34 comes down after the clamp comes up, the operation shown in Fig. 15 is performed and the tool and clamp withdrawn. At the next step the tool 35 countersinks the nut still further, as shown in Fig. 16. Then when the machine stops again the roller 36 performs the function shown in Fig. 17 and at the next stop the slitting saw 50 acts as shown in Fig. 18. It will be understood, of course, that while each of these operations is being performed on one nut all the others are also being performed on others. The next step is the feeding of the end of the wire into the slot 97 and into the position shown in Figs. 19 and 7. The mandrel $79^b$ now starts to rotate, clamps the end of the wire, twists it around three-quarters of the way and holds it while the anvil 91 comes down on the nut. The guide $67^a$ is forced upwardly severing the wire on an angle. The mandrel is now raised followed by the anvil 91, which finishes that operation leaving the spring in the nut as shown in Figs. 20 and 21. Then finally the emery wheel 103 comes down and trims off the ragged end of the wire leaving the completed lock nut as set forth in the above identified patent of Napoleon R. Thibert.

This constitutes a simple continuous operation capable of large production and requiring very little attendance.

Although I have illustrated and described only a single form of the invention I am aware of the fact that modifications can be made therein by any person skilled in the art without departing from the scope of the invention as expressed in the claims. Therefore, I do not wish to be limited to all the details of construction herein shown and described, but what I do claim is:—

1. In a machine for forming lock nuts, the combination with a carrier having an intermittent motion and provided with threaded studs thereon, of means adjacent thereto for screwing up nuts on said studs as they move past said means, means for engaging the sides of said nuts as they travel along after they are screwed up for slightly turning any nut that is not in position with two sides parallel with the path of movement to straighten the position of the nut, of a series of parallel tool spindles for first chamfering a nut while on the carrier, then countersinking it, and then swaging down the edge of the wall surrounding the depression to form an undercut groove around the nut on the top.

2. In a machine for converting standard nuts into locknuts, the combination with a carrier having an intermittent motion and provided with threaded studs thereon, of means adjacent thereto for screwing up nuts on said studs as they move along, means for engaging the sides of said nuts as they travel along located on opposite sides of the path of travel for first unscrewing any nut that is not in position with two sides parallel with the path of movement and for thereafter engaging the opposite side to straighten the position of the nut further by screwing it on a little if that is necessary, of a series of tools located at the same distance apart as the studs on the carrier for countersinking a nut while the carrier is in stationary position, then increasing the counter-sunk depression, and then rolling down the edge of the depression to form an undercut groove around the nut on the top.

3. In a machine for making lock nuts, the combination with a carrier having threaded means for supporting nuts thereon at equal distances apart, means for intermittently moving the carrier a distance at each motion equal to the distance apart of two adjacent nuts thereon, means for screwing up the nuts on the carrier to a position in which their parallel sides will be parallel with the line of motion of the carrier, means for clamping a series of nuts when the carrier stops, means for performing operations on the tops of the nuts at that time including a counter-sinking tool for countersinking a flat bottomed depression in the top of a nut, and means for rolling down the edge of the counter-sunk depression to form an undercut groove therein for the reception of a locking wire spring.

4. In a machine for making lock nuts from standard nuts, the combination with a carrier having means for supporting said standard nuts thereon at equal distances apart, means for intermittently moving the carrier, means for clamping a series of nuts when the carrier stops, means for counter-sinking a flat bottomed depression in the top of a nut, and means for rolling down the edge of the counter-sunk depression to form an undercut groove therein for the reception of a locking wire spring.

5. In a machine for converting standard nuts into lock nuts, the combination of means for counter-sinking the face of a nut and providing a flat bottomed recess having cylindrical walls, a spindle movable axially with respect to a nut, a shaft carried by said spindle at right angles thereto, a roller carried by said shaft having a cylindrical operating surface thereon adapted to engage the edge of the nut, whereby the rotation of the spindle will cause the roller to roll around the upper edge and swage it over inwardly to form a circular undercut groove in the top of the nut.

6. In a machine for converting standard nuts into lock nuts, the combination of means for counter-sinking the faces of the nuts and providing a flat bottomed recess having cylindrical walls extending substantially to the edge thereof, a spindle movable up and down axially with respect to a nut on the machine, a shaft carried by said spindle at right angles thereto, a roller carried by said shaft having a pair of cylindrical operating surfaces thereon adapted to engage the opposite edges of the nut simultaneously, whereby the rotation of the spindle will cause the roller to roll around said upper edges and roll them over inwardly to form a circular undercut groove in the top of the nut, and means for cutting a radial slit through the wall into the groove to provide a place for the introduction of a wire.

7. In a machine of the character described, the combination with means for counter-sinking the face of a nut, means for working the metal over at the outer surface of the nut to convert the depression into a circular undercut groove, and means for forming a slit into said groove from the outside, of means for feeding a wire into said slit, and means for then turning the wire around part of a circle inside the groove, whereby the end of the wire will be bent at an angle to the adjacent portion of the wire and it will be left in the undercut groove.

8. In a machine of the character described, the combination with means for forming a circular undercut groove in the face of a nut, and means for forming a slit radially into said groove from the outside, of means for locating the nut in stationary position, means for feeding a wire radially into said slit, and means for then carrying the wire around a part of a circle inside the groove and at the same time drawing the wire in through the slit, whereby the end of the wire will be bent at substantially right angles to the adjacent portion of the wire and it will be left in the undercut groove.

9. In a machine of the character described, the combination with means for supporting a nut in stationary position, said nut having an undercut groove in its face and a slit extending through its wall into the interior for receiving a wire of a mandrel in axial alignment with the nut, said mandrel having a notch for receiving the end of the wire, means for moving the mandrel into the interior of said groove centrally, means for turning the mandrel through a part of a revolution, and means for then raising the mandrel to release it from the wire.

10. In a machine of the character described, the combination with means for supporting a nut in stationary position, said nut having an undercut groove in its face and a radial slit extending through its wall into the interior for receiving a wire, a mandrel in axial alignment with the nut, means for depressing the mandrel into the interior of said groove centrally, said mandrel having a radial notch for receiving the end of the wire, means for turning the mandrel through a part of a revolution, whereby the wire will be bent substantially at right angles and will be drawn through the slit into said groove and will engage the surface of said groove throughout most of its length, means for then raising the mandrel to release it from the wire, and means for smoothing off the end of the wire projecting from the surface of the nut.

11. In a machine of the character described, the combination with an intermittently operating carrier for supporting the nuts to be operated upon having an undercut circular groove in the top and a slit through the wall into the groove, of means for feeding a wire into said slit so as to project into the groove, a spindle, a main shaft, a cam on said shaft, means connected with said cam for periodically raising and lowering the spindle, a pinion on said spindle, a rack meshing with said pinion, and a cam on the shaft connected with said rack for turning it when the spindle is depressed to rotate the spindle through less than a complete revolution and restore it to normal condition after the spindle is raised, whereby the spindle can be caused to engage the end of the wire and turn it around in the groove and leave it there.

12. In a machine of the character described, the combination with an intermittently operating carrier for supporting the nuts to be operated upon, a shaft connected for driving the carrier, and means operated by the shaft for forming an undercut circular groove in the top of each nut and a slit through the wall into the groove, of means for feeding a wire into said slit so as to project into the groove, a spindle, a cam on said shaft, means connected with said cam for periodically raising and lowering the spindle timed so that the spindle will always be raised when the carrier is moving, a pinion on said spindle, a rack meshing with said pinion, and a second cam on the shaft connected with said rack for turning it when the spindle is depressed so as to rotate the spindle through less than a complete revolution and restore it to normal condition after the spindle is raised, whereby the spindle can be caused to engage the end of the wire and turn it around in the groove and leave it there.

13. In a machine of the character described, the combination with an intermittently operating carrier for supporting the nuts to be operated upon, a shaft connected for driving the carrier, and means operated by the shaft for forming an undercut circular groove in the top of each nut and a slit through the wall into the groove, of means for feeding a wire into said slit so as to project into the groove, a spindle, a cam on said shaft, means connected with said cam for periodically raising and lowering the spindle, a second cam on the shaft connected to rotate the spindle through less than a complete revolution, an annular anvil of hardened steel surrounding the spindle and having a flat surface thereon constituting a cutting edge, a third cam on said shaft, means connected with said third cam for raising and lowering the anvil to bring it into contact with the nut and remove it therefrom, a guide for the wire having a hardened steel flat face adapted to co-operate with the flat edge of the anvil to cut off the wire, said guide being mounted to move, a fourth cam for said shaft, and means connected with the fourth cam for moving the guide after the wire is inserted in the nut to cut off the wire.

14. In a machine of the character described, the combination with a carrier having an intermittent motion for supporting and feeding nuts to be operated upon, of a spindle located in a position under which each nut is stopped as the carrier operates, said spindle having a notch therein for receiving the end of a wire, a cam shaft, a series of cams on said shaft, one of said cams having means for moving the spindle down into a recess in the top of the nut in a position for the notch to receive the end of a wire fed into the nut, means connected with a second cam on the shaft for rotating the spindle, a cutting member co-operating with the spindle but movable independently thereof, means connected with another cam on said shaft for lowering the cutting member into contact with the nut, a guide through which the wire is inserted into the nut, said guide having a cutting edge co-operating with said cutting member, and means operated by another cam on said shaft for operating the guide to cut off the wire.

15. In a machine of the character described, the combination with a carrier having an intermittent motion for supporting and feeding nuts to be operated upon, of a spindle located in a position under which each nut is stopped as the carrier operates, said spindle having a notch therein for receiving the end of a wire, a cam shaft, a series of cams on said shaft, one of said cams having means for moving the spindle down into a recess in the top of the nut when the carrier stops in a position for the notch to receive the end of a wire fed into the nut, means connected with a second cam on the shaft for rotating the spindle through less than a complete rotation while in that position and for reversing the spindle after the spindle is raised, a cutting member co-operating with the spindle but movable independently thereof, means connected with another cam on said shaft for lowering the cutting member into contact with the nut while in stationary position, a guide through which the wire is inserted into the nut, said guide having a cutting edge co-operating with said cutting member, the cutting edges of both being located at a slight angle with respect to the direction of the wire so as to cut the wire off with a sharpened point, and means operated by another cam on said shaft for operating the guide to cut off the wire after the spindle is turned.

In testimony whereof I have hereunto affixed my signature.

GEORGE F. SCHNYER.